United States Patent
Banerjee et al.

(10) Patent No.: US 7,653,054 B2
(45) Date of Patent: Jan. 26, 2010

(54) ZONE BASED QUALITY OF SERVICE IN A FIBRE CHANNEL FABRIC

(75) Inventors: Subrata Banerjee, Los Altos, CA (US); Shankar Ramanathan, Indiranagar (IN); Sriharsha Jayanarayana, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 11/153,656

(22) Filed: Jun. 14, 2005

(65) Prior Publication Data

US 2006/0215663 A1    Sep. 28, 2006

(51) Int. Cl.
*H04L 12/28* (2006.01)
(52) U.S. Cl. .................. 370/389; 370/401; 370/235
(58) Field of Classification Search .................. None
See application file for complete search history.

(56) References Cited

U.S. PATENT DOCUMENTS

| | | | |
|---|---|---|---|
| 2003/0079019 A1 | 4/2003 | Lolayekar et al. | |
| 2004/0028056 A1* | 2/2004 | Mitchem et al. | 370/395.21 |
| 2004/0049564 A1 | 3/2004 | Ng et al. | |
| 2005/0036499 A1* | 2/2005 | Dutt et al. | 370/401 |
| 2005/0041657 A1* | 2/2005 | Banerjee et al. | 370/389 |
| 2007/0211650 A1* | 9/2007 | Banks et al. | 370/254 |
| 2007/0223502 A1* | 9/2007 | Green | 370/401 |

OTHER PUBLICATIONS

Fibre Channel—Overview of the Technology, retrieved from www.fibrechannel.org/technologyoverview.html downloaded Feb. 3, 2006.
PCT Search Report from Application No. PCT/US06/10276, Issued Feb. 26, 2007.
PCT Written Opinion from Application No. PCT/US06/10276, Issued Feb. 26, 2007.
Chinese First Office Action mailed Apr. 7, 2009 from U.S. Appl. No. 20060004005.5.

* cited by examiner

*Primary Examiner*—Duc C Ho
(74) *Attorney, Agent, or Firm*—Weaver Austin Villeneuve & Sampson LLP

(57) ABSTRACT

Methods and apparatus are provided for improving the configuration, management, and distribution of quality of service information in a fibre channel fabric using zoning mechanisms. Configuration of Quality of Service (QoS) information is made easy by using zones as a classifier for flows. QoS information is included in zone objects, thereby using the existing zone distribution mechanism to distribute QoS information. Devices not part of any zones are placed automatically in the default zone with a default QoS priority level. QoS information for a particular packet is available as soon as the zoning information is obtained.

24 Claims, 8 Drawing Sheets

Figure 3

Flow Based Quality of Service (QoS) Table 311

| Source PWWN 301 | Destination PWWN 303 | QoS Level 307 |
|---|---|---|
| 10:00:00:00:c9:32:8b:a8 | 20:06:0e:80:03:4e:95:22 | medium |
| 10:00:00:00:c9:32:8b:a9 | 50:00:1f:e1:00:10:3d:11 | high |
| 50:06:0e:80:03:4e:95:a1 | 20:03:0f:00:ff:31:82:12 | high |
| 20:00:1f:e1:00:10:3d:c1 | 50:00:ff:00:c9:32:8b:eb | low |
| 10:00:1f:e1:00:10:3d:11 | 20:20:de:ff:c9:32:8b:12 | medium |
| 20:03:0f:00:cd:31:82:a3 | 50:03:1f:ff:c0:31:22:ae | low |

| Zone Object 401 | |
|---|---|
| Zone Name 411 | Backup_A |
| QoS Level 413 | medium |
| VSAN 415 | VSAN_8 |
| Device 417 | 23:03:0f:00:ff:31:82:ae |
| Device 419 | 11:00:ff:00:c9:32:8b:a8 |
| Device 421 | 18:20:de:ff:c9:43:8b:a9 |
| Device 423 | 21:03:1f:ff:c0:31:22:ae |

429, 431, 433, 435, 437, 439, 441

ZONE BASED QUALITY OF SERVICE IN A FIBRE CHANNEL FABRIC

BACKGROUND OF THE INVENTION

1. Field of the Invention

The present invention generally relates to storage area networks. More specifically, the present invention provides mechanisms for providing quality of service using zones in a fibre channel fabric.

2. Description of Related Art

In many fibre channel based storage area networks (SANs), support for quality of service is limited. One typical mechanism for providing quality of service involves assigning a quality of service level to individual flows. A flow typically includes a source and a destination. A storage area network can have thousands of hosts and end devices and thousands of corresponding world wide names. Assigning quality of service levels to flows identified using world wide names or similar identifiers can be difficult to configure and maintain. Distribution of the QoS configuration is also needed to ensure that a flow gets the same QoS even if an associated device is moved to a different domain.

Zoning is a mechanism supported in storage area networks. Zoning allows the partition of a fibre channel fabric into smaller fabrics to allow the implementation of features such as security and restrictions. Devices belonging to a single functional group are typically placed under the same zone. For example, devices involved in online transactions can be placed in one zone while devices associated with backing up user data can be placed in another zone. Because of the diverse nature of the traffic in a fabric, it is beneficial to provide different QoS requirements for functionally dissimilar groups.

Although zoning helps in segregating different user groups, it does not provide service differentiation across zones. Consequently, it is therefore desirable to provide methods and apparatus for providing improved quality of service mechanisms in a fibre channel fabric. The quality of service mechanisms can provide a higher level of abstraction for configuring QoS and distributing QoS information across the fibre channel fabric.

SUMMARY OF THE INVENTION

Methods and apparatus are provided for improving the configuration, management, and distribution of quality of service information in a fibre channel fabric using zoning mechanisms. Configuration of Quality of Service (QoS) information is made easy by using zones as a classifier for flows. QoS information is included in zone objects, thereby using the existing zone distribution mechanism to distribute QoS information. Devices not part of any zones are placed automatically in the default zone with a default QoS priority level. QoS information for a particular packet is available as soon as the zoning information is obtained In one embodiment, a method for managing quality of service (QoS) information in a fibre channel fabric is provided. A first set of devices in a first zone in the fibre channel fabric is identified. A first quality of service level is assigned to the first zone. Assigning the first quality of service level to the first zone includes assigning the first quality of service level to communications between the first set of devices of devices. A second set of devices in a second zone in the fibre channel fabric is identified. A second quality of service level is assigned to the second zone. Assigning the second quality of service level to the second zone includes assigning the second quality of service level to communications between the second set of devices.

In another embodiment, a system for managing quality of service (QoS) information in a fibre channel fabric is provided. The system includes memory, a processor, and an interface. The processor is coupled to the interface and memory. The processor is configured to identify a first set of devices in a first zone in the fibre channel fabric and assign a first quality of service level to the first zone. Assigning the first quality of service level to the first zone includes assigning the first quality of service level to communications between the first set of devices. The interface is coupled to the processor. The interface is configured to distribute zone information along with quality of service information in the fibre channel fabric.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 3 is a diagrammatic representation showing one example of a flow-based quality of service configuration.

FIG. 4 is a diagrammatic representation showing one example of a zone object.

DETAILED DESCRIPTION OF SPECIFIC EMBODIMENTS

Figure 1:
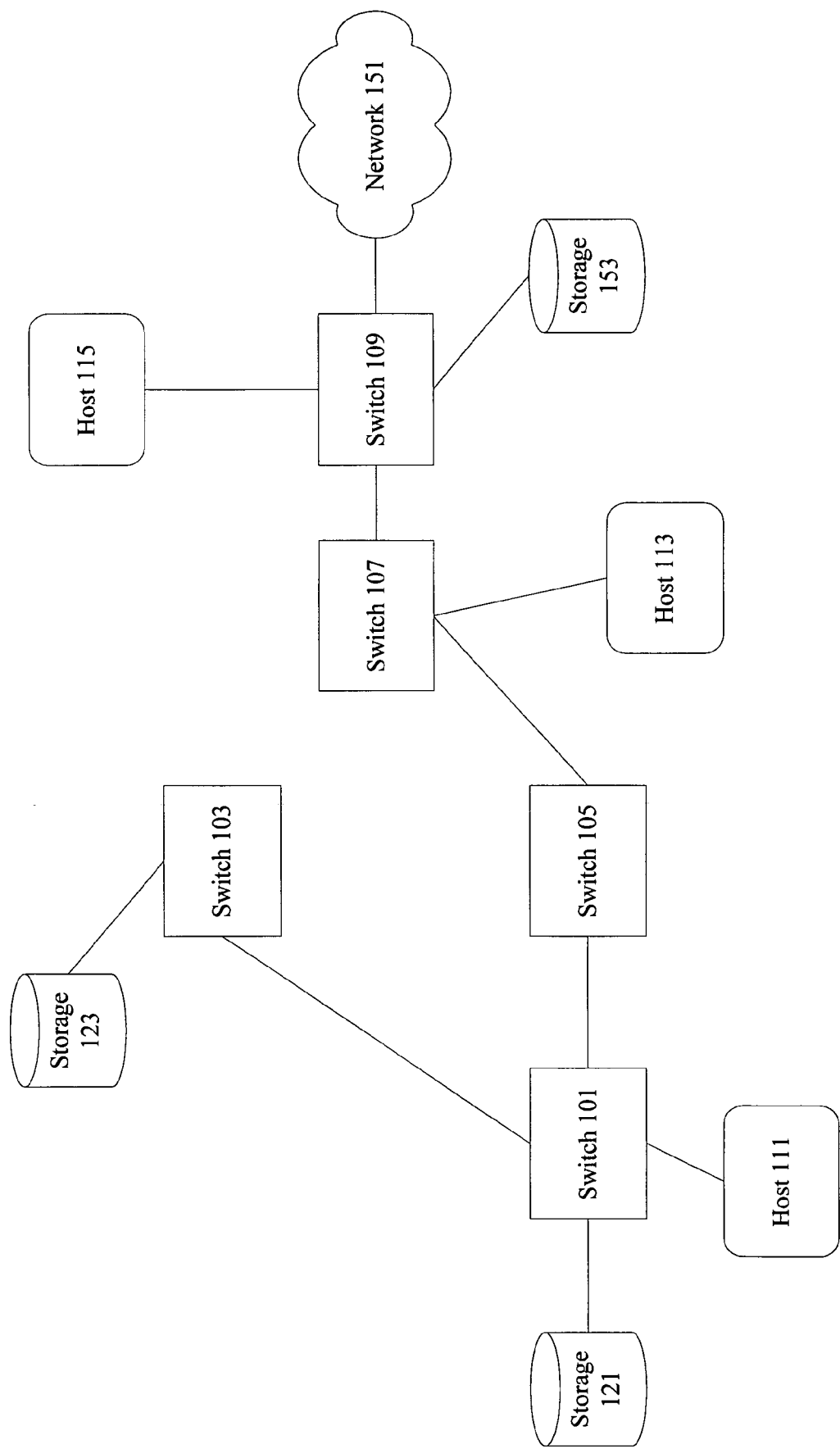
FIG. 1 is a diagrammatic representation showing one example of a fibre channel network that can be used to implement the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Quality of service (QoS) allows a user to prioritize one type of traffic over another type of traffic in a network such as a storage area network. In one example, traffic associated with online transactions can be given higher priority than traffic associated with backing up user data. A request sent from a user to a disk array to perform online transactions can be sent using packets granted high priority. However, packets transmitted to a tape device in order to back up user data can be allocated low priority status.

Actions for configuring quality of service on any network such as a storage area network are relatively limited. In typical implementations, priority levels are assigned to particular flows in a quality of service manager database. Storage area networks identify devices such as tape devices and disk arrays using port world wide names (pwwns). The port world wide names, such as 22:35:00:0c:85:e9:d2:c2 or 13:d3:33:d1:0c:93:e9:d2 typically have associated fibre channel identifiers (FCIDs). A quality of service manager database may include pairs of pwwns/FCIDs and associated priority levels.

When a device is added to a fibre channel fabric, a system administrator often specifies a quality of service level in a quality of service manager database for communications between the new device and many existing devices. Managing a quality of service manager database is often cumbersome and inefficient. In many instances, fibre channel fabric network administrators are unfamiliar with the mechanisms for configuring quality of service manager databases, as quality of service is a relatively new phenomenon in fibre channel networks.

Conventional mechanisms involve using separate configuration, administration, and distribution mechanisms to provide quality of service at individual switches. Conventional fibre channel standards do not have a distribution mechanism for QoS and rely on system administrators for manual distribution of information. In one example, a specific quality of service manager is required on fibre channel switches and distribution is performed manually. Having separate configuration, administration, and distribution mechanisms creates added layers of complexity in fibre channel quality of service administration.

A mechanism that fibre channel network administrators are often familiar with is zoning. Zoning allows the partition of a fibre channel fabric into smaller fabrics to allow the implementation of features such as security and restrictions. Devices belonging to a single functional group, such as financial backup devices or human resources department devices, are typically placed under the same zone. Communication is allowed for devices in a common zone. If the source and destination of the packet are not at least in one common zone, transmission is not allowed.

Zones are typically managed at individual fibre channel switches in a logical or physical fibre channel fabric. Although zoning allows separation of different user groups, it does not provide service differentiation across groups. Consequently, the techniques and mechanisms of the present invention recognize that the familiar concept of zoning in fibre channel networks can be used to provide quality of service. According to various embodiments, each zone can be configured with quality of service parameters.

In one example, the zone can include multiple devices associated with a data group or a financial group. In another example, a zone includes a source and destination pair of fibre channel fabric devices. Consequently, a zone can be used to specify particular flows and the level of service for particular flows. Mechanisms are also provided for handling virtual storage area network merges to allow maintenance of zones and priority levels. Quality of service information can be distributed using the same mechanisms provided for zone information distribution. It should be noted that quality of service information can also be distributed using conventional mechanisms used to synchronize fabric switches.

FIG. 1 is a diagrammatic representation of one example of a network that can use the techniques of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-port (non F-ports). Non fabric-ports include interswitch ports (E-ports). Ports used to connect a switch to a host are referred to herein as fabric-ports (F-ports). In one example, non F-ports are used to connect switch 105 to switch 107 while F-ports are used to connect switch 107 to host 113. Similarly, fabric loop-ports (FL-ports) are used to connect switch 103 to storage resource 123. Ports such as F-ports and FL-ports are herein referred to as edge ports. Other ports such as E-ports are referred to as non-edge ports. Zoning is typically applied on the edge ports.

Storage resources 123 and 153 may be fabric loops coupled respectively to switches 103 and 109 through FL-ports. The fabric loops typically include multiple storage devices. Any mechanism for connecting multiple storage devices that allows only access to a subset of devices at any point in time. In one example, a loop is a Small Computer Systems Interface (SCSI) loop that allows connection of 8 or 16 devices in a half-duplex framework.

According to various embodiments, a packet is transmitted from host 111 to storage resource 153. Before the packet is forwarded through fibre channel switches including switch 101, the fibre channel switch 101 determines if the host 111 is allowed to communicate with storage resource 153. In a typical example, the host 111 determines if there is a zone that includes both host 111 and storage resource 153. If host 111 and storage resource 153 share a common zone, transmission is allowed. If host 111 and storage resource 153 are not in a common zone, the packet may be dropped. Zone based forwarding restrictions are typically managed by a zone server process running on individual fibre channel switches.

In typical implementations, after zone based forwarding restrictions are determined, quality of service can then be applied. In typical instances, the quality of service manager is then invoked to determine forwarding priority levels. In many instances, this requires an access to a separate table having entries corresponding to source and destination pairs. A look up to this table based on the source and destination of the packet is used in order to determine priority information. Requiring additional applications and additional database lookups causes inefficiency and delays in forwarding traffic.

Figure 2:
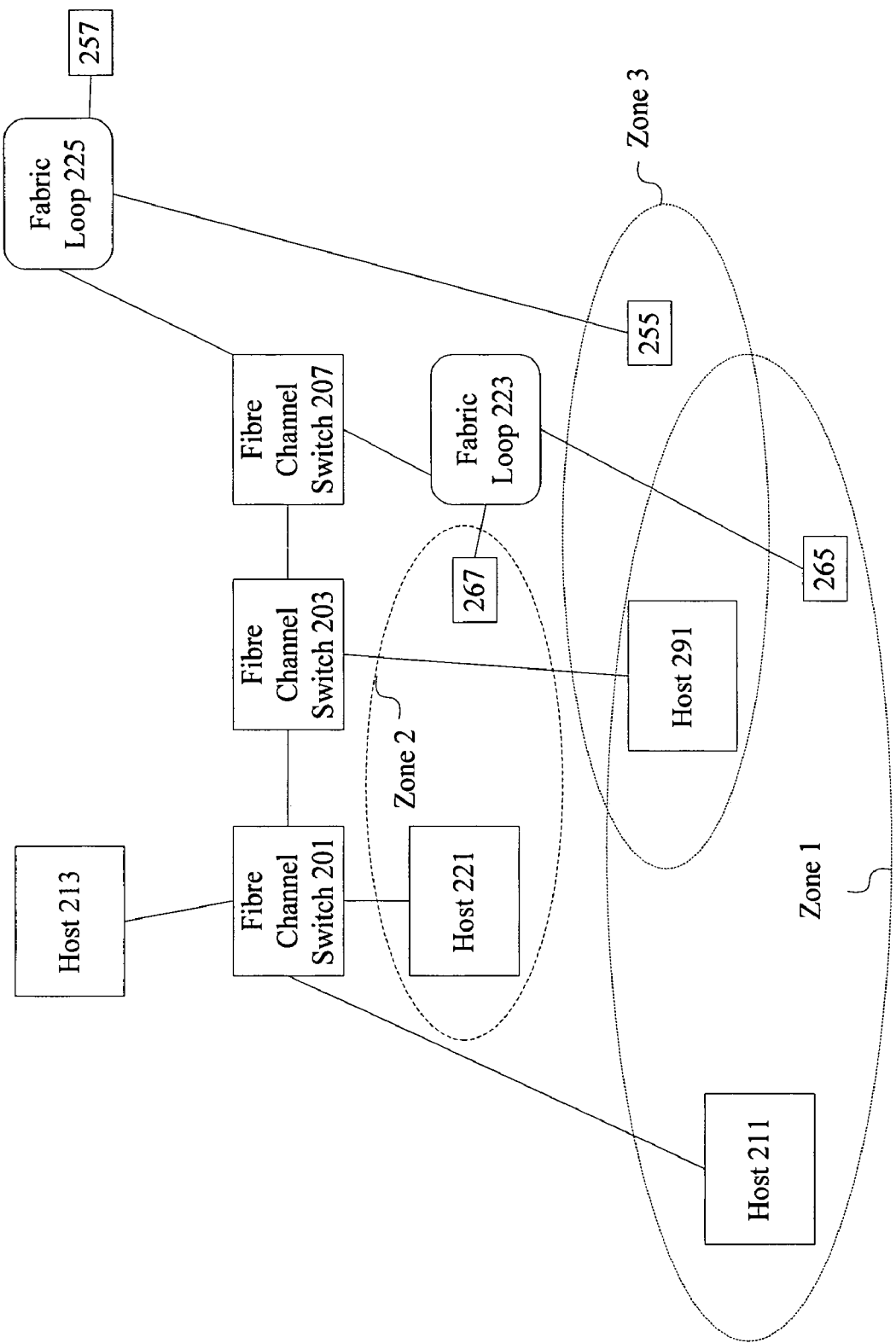
FIG. 2 is a diagrammatic representation showing a fibre channel network having devices in different zones.

FIG. 2 is a diagrammatic representation showing a variety of storage devices. A fibre channel network includes fibre channel switches 201, 203, and 207. Switch 201 is coupled to host 211, 213 and 221 through different F-ports. Switch 203 is coupled to switches 201 and 207 through E-ports. Switch 203 is coupled to switches 201 and 207 through E-ports. Switch 203 is coupled to host 291 through an F-port. Switch 207 is coupled to fabric loops 225 and 223 through FL-ports. Fabric loop 225 includes storage device 255 and 257. Fabric loop 223 includes storage devices 265 and 267.

According to various embodiments, hosts 211, 291 and the device 265 are included in Zone 1 while host 221 and device 267 are included in Zone 2. Device 255 and host 291 are included in Zone 3. Some devices and hosts may be included in more than one zone. Other devices and hosts may not be included in any zones. According to various embodiments, devices not included in any zone are assigned to a default zone. In this example, device 257 and host 213 come under the default zone. Default zone devices can only communicate with other default zone devices. The techniques of the present invention provide that zones may be provided quality of service levels.

For example, hosts 211, 291 and the device 265 may be provided with a high quality of service level. In some embodiments, the zone information is maintained at all fibre channel switches in the network. In other embodiments, zone information for connected hosts and devices is maintained at fibre channel switches connected to the hosts and devices. For example, zone information for hosts 211 and 221 is maintained at fibre channel switch 201 and the zone information for the devices 255, 257, 265 and 267 are maintained at fibre channel switch 207. Each zone can also be provided with a name such as Payroll_Information_Zone or Backup_Data_Zone.

According to various embodiments, the zone information database is mirrored throughout the network. In some instances, the alias database is maintained on all physically connected fibre channel switches in a fibre channel fabric, although other configurations are also possible. For example, some fibre channel switches may not maintain a zone database or may maintain only a partial copy of the zone database. The alias database can be accessed using a variety of interfaces including command line interfaces. Using a zone database to maintain quality of service information allows ease of configuration, management, and distribution. Conventional flow based quality of service tables such as that shown in FIG. 3 are often difficult to configure, manage, and distribute.

FIG. 3 is a diagrammatic representation showing one example of a flow based quality of service table. According to various embodiments, a flow based quality of service table 311 is accessed after a fibre channel switch receives a packet. The fibre channel switch accesses the source and destination information in the packet to locate an entry in the flow based quality of service table 311. In some examples, the quality of service table 311 identifies source and destination entities using port worldwide names 301 and 303. Other mechanisms such as fibre channel identifiers (FCIDs) can also be used. A quality of service level 307 is associated with each flow 321-331. Quality of service can be designated using levels such as low, medium, and high or using other mechanisms such as numerical values adhering to the DiffServ standards by using the DiffServ Code Point (DSCP) values.

Using a flow based quality of service table 311 requires that a fibre channel switch access both a zone object to determine if forwarding is allowed and a quality of service table to determine how forwarding should proceed. Although accessing two separate tables may seem inconsequential, single packet delays can be substantial when forwarding packets at line rate.

Consequently, the techniques of the present invention provide quality of service information within particular zone objects. Providing quality of service information in zone objects allows ease of configuration as users in a fibre channel network are accustomed to setting up zones having multiple devices, and avoids the tedious process of identifying flows and assigning QoS parameters for individual flows. Providing QoS information in zone objects also enables the user to use the distribution mechanism of zone to propagate the QoS information which would otherwise require a separate mechanism.

FIG. 4 is the diagrammatic representation of one example of a zone object. According to various embodiments, the zone object 401 includes fields 429-441. The zone object 401 includes a zone name for identifying a particular zone. According to various embodiments, the zone name 411 is unique in a particular (virtual) storage area network. The quality of service level 413 is also provided to specify the quality of service level for forwarding packets between zone members. The virtual storage area network identifier 415 is used to identify the (virtual) storage area network associated with the zone object 401. An object 401 can also include multiple devices 417-441.

Devices can be specified using port worldwide names with identifiers such as FCIDs. Consequently, when the fibre channel switch is forwarding the packet, the virtual switch accesses the source and destination information in the packet to determine if the source and destination information reside in a common zone. If the source and destination reside in a common zone, the quality of service level can immediately be accessed and the packet can be forwarded without a separate access to a flow based quality of service table.

According to various embodiments, if the source and destination reside in more than one zone, the highest quality of service level is used. For example, a source having a port world wide name of 23:03:0f:00:ff:31:82:ae and a destination having a port world wide name of 11:00:ff:00:c9:32:89b:a8 reside in two zones Backup_A and HR__10 with respective quality of service levels of low and high. In one example, the better level high is taken for forwarding.

Although one example of the zone object is shown, other fields can also be included in the zone object. For example, other attributes such as broadcast, protocol, and vendor specific fields can also be included. Zone objects can also be merged when (virtual) storage area networks are merged. According to various embodiments, zone objects from two separate virtual storage area networks are combined unless zone names are identical. If zone names are identical, a user may be queried or a new name may be assigned to one of the zones. Errors can also be generated. Various embodiments of the present invention specify that the QoS parameters be the same if the zone names are identical, for the merge to succeed.

Figure 5A:
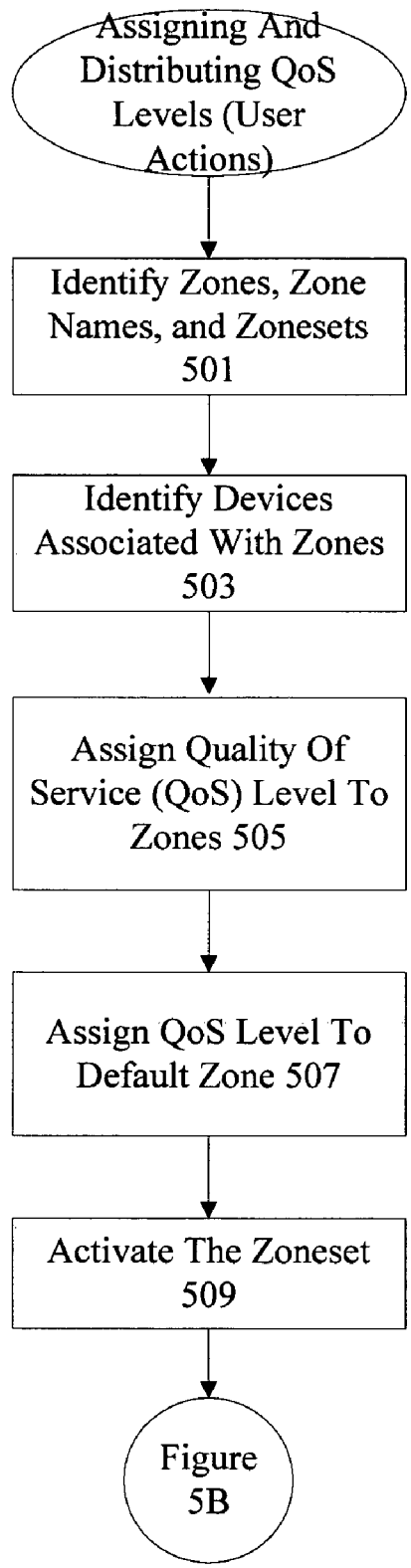
FIG. 5 is a flow process diagram explaining one technique for configuring and distributing QoS parameters using zones.
Figure 5B:
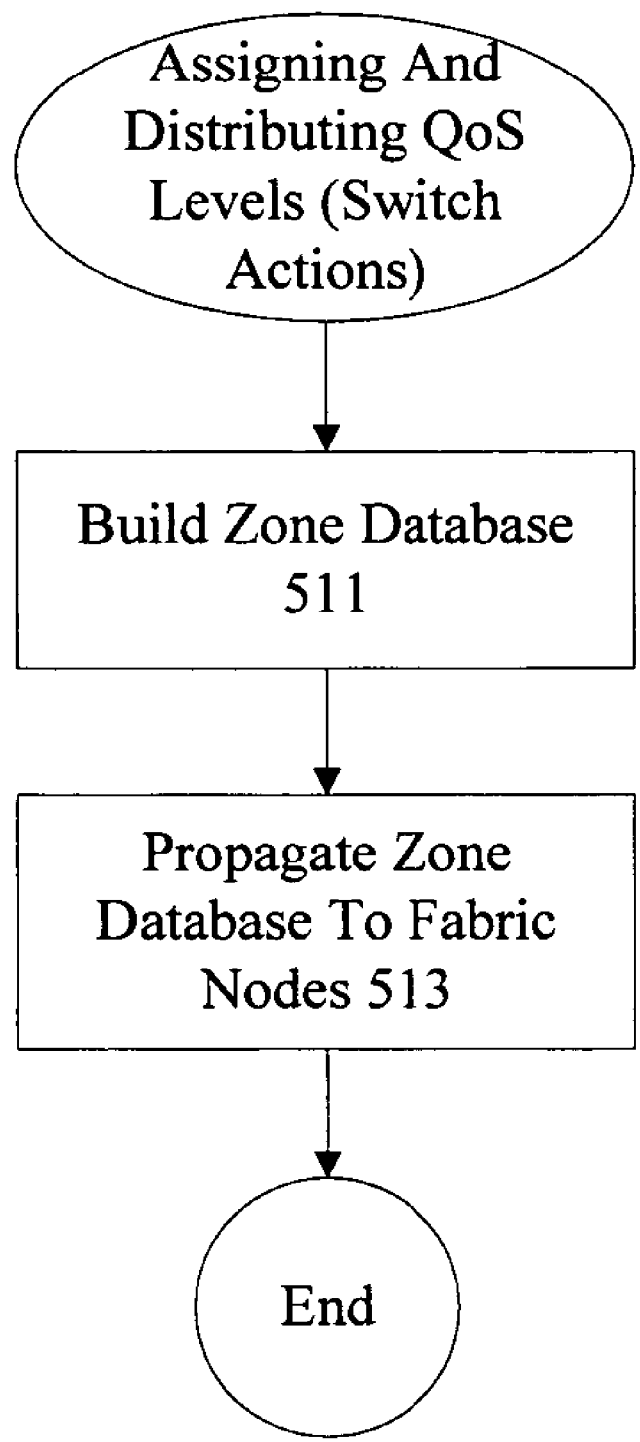

FIGS. 5A and 5B are flow process diagrams showing an example of configuring and distributing QoS information. FIG. 5A shows user actions while FIG. 5B shows switch actions. At 501, zones, zone names and the zonesets are identified. At 503, devices associated with zones are identified. At 505, the quality of service levels are assigned to particular zones. At 507, quality of service levels are assigned for a default zone. The quality of service levels can be assigned at the same time the users perform zone configuration or zone setup. According to various embodiments, all devices that are not included in at least one zone are placed in a default zone having a priority level configured for the default zone.

For example, unassigned devices may include disk arrays, tape devices, hosts, etc. In one example, hosts use tape devices to periodically perform data backups. To assign tape devices to a low priority zone, tape devices and the relevant hosts are placed in a low priority level zone. Hosts and disk arrays involved in high priority traffic are placed in a zone having a high priority level and all devices that are not included in any of the zones are placed automatically in the default zone, with the priority level configured for the default zone.

The zone set comprising the zones is activated at 509. The switch builds the zone database (including the QoS information) at 511. According to various embodiments, zone and quality of service information is propagated to all other physically connected fibre channel switches in a fibre channel network described at 513. All the quality of service information can be propagated using the same mechanisms conventionally used to propagate zone information.

Figure 6:
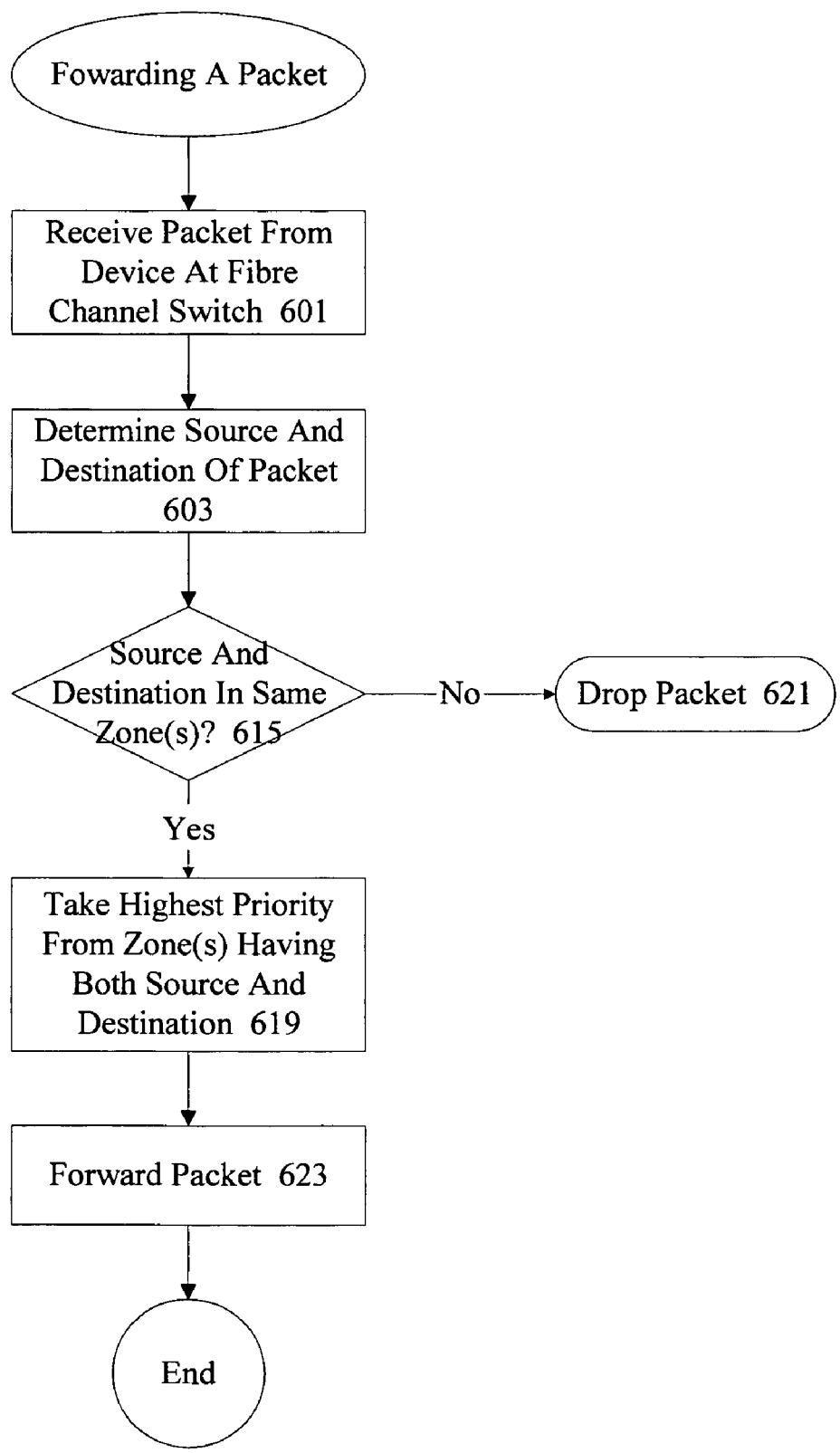
FIG. 6 is a flow process diagram showing one technique for transmitting a packet using zone based QoS.

FIG. 6 is a flow process diagram showing one example of a technique for forwarding a packet at a fibre channel switch. At 601, the packet is received from a device at the fibre channel switch. At 603, the source and destination of the packet is determined. The source and destination may be identified using port worldwide names or fiber channel identifiers. According to various embodiments, the storage area network associated with the packet is also determined. At 615, it is determined if the source and destination reside in the same zone. If the source and destination do not reside in at least one common zone, transmission between the two entities is not allowed. The packet can be dropped at 621. This may prevent a particular user who does not have access to a payroll database from accessing payroll information.

If the source and destination are in at least one common zone at 615, the highest priority from the zone having both the source and destination is taken at 619. For example, if one zone having both the source and the destination has a priority of medium and the other zone having the same source and destination pairs has the priority of low, data is forwarded at a medium priority level.

The packet is then forwarded at 623 using the assigned priority level. According to various embodiments, the packet can be forwarded using token buckets. The token buckets may vary in size and may be filled at different rates. For example, the high priority token bucket may hold up to 70 tokens and be refilled at a faster rate than a medium priority token bucket that holds only 30 tokens. When a packet is forwarded, it is determined if any tokens are availability in the associated bucket. If no tokens are available, the packet may be held in a buffer while a token bucket is refilled.

Figure 7:
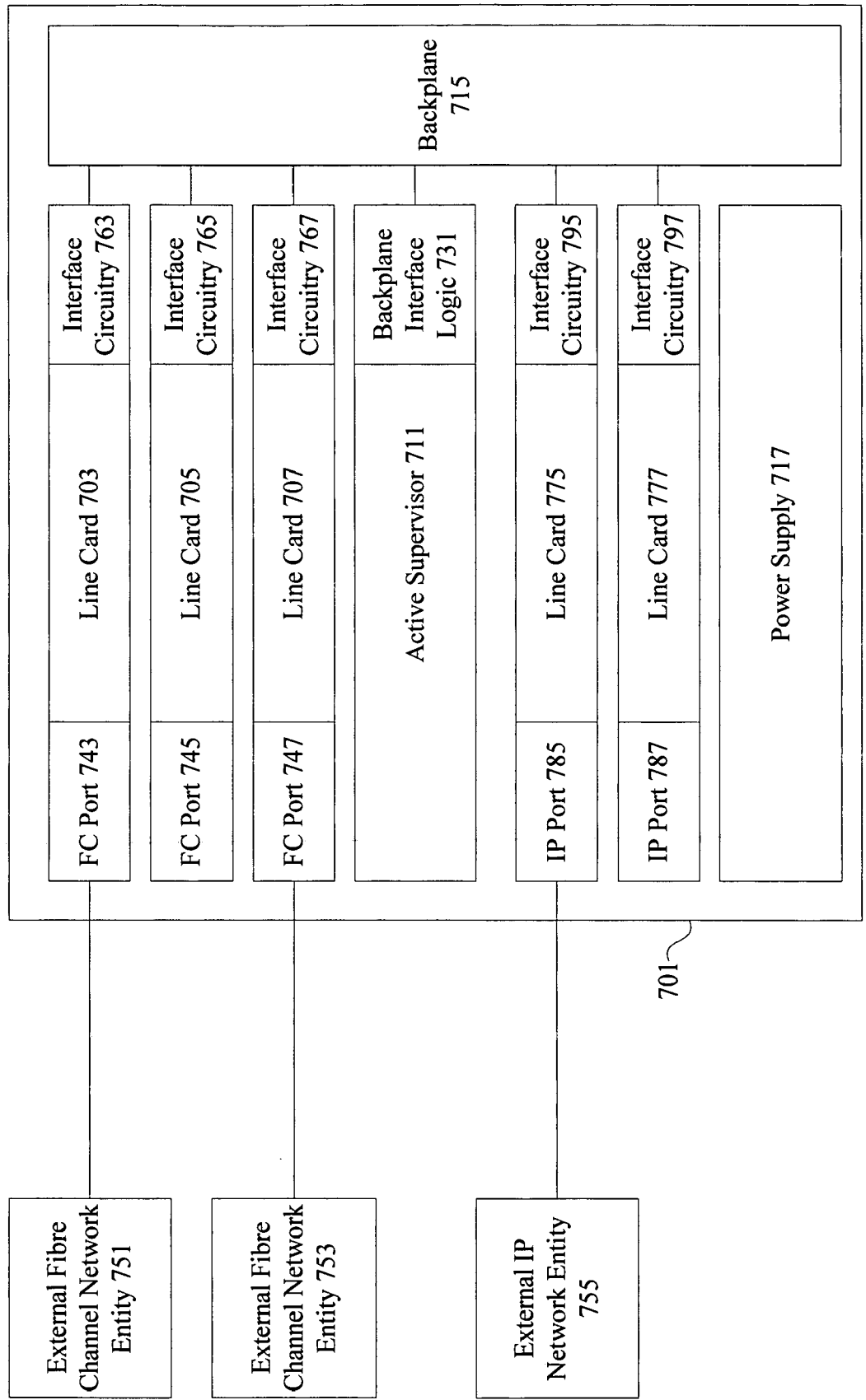
FIG. 7 is a diagrammatic representation depicting a fibre channel switch.

FIG. 7 is a diagrammatic representation of one example of a fibre channel switch that can be used to implement techniques of the present invention. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 763, 765, and 767 and the backplane 715. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. The fibre channel switch can also include line cards 775 and 777 with EP ports 785 and 787. In one example, IP port 785 is coupled to an external IP network entity 755. The line cards 775 and 777 also have interfaces 795 and 797 to the backplane 715.

It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for managing quality of service (QoS) information in a fibre channel fabric, the method comprising:

identifying a first plurality of devices in a first zone in the fibre channel fabric;

assigning a first quality of service level to the first zone, wherein assigning the first quality of service level to the first zone comprises assigning the first quality of service level to communications between the first plurality of devices;

identifying a second plurality of devices in a second zone in the fibre channel fabric; and assigning a second quality of service level to the second zone, wherein assigning the second quality of service level to the second zone comprises assigning the second quality of service level to communications between the second plurality of devices.

2. The method of claim 1, wherein the first quality of service level is a quality of service marker.

3. The method of claim 1, wherein the first quality of service level is a quality of service indicator designating a priority level for traffic associated with the first plurality of devices.

4. The method of claim 1, wherein the first plurality of devices are devices involved in online transactions.

5. The method of claim 1, wherein the first plurality of devices are devices involved in backing up user data.

6. The method of claim 1, wherein the first quality of service level and the second quality of service level are assigned at a fibre channel switch.

7. The method of claim 1, wherein the first plurality of devices includes hosts and end devices.

8. The method of claim 7, wherein the first plurality of devices includes tape devices and disk arrays.

9. The method of claim 1, wherein the first zone is maintained as a first zone object in a zone database.

10. The method of claim 9, wherein the first zone object includes the first quality of service level as a parameter.

11. The method of claim 10, wherein the first zone object further includes identifiers corresponding to the first plurality of devices.

12. A system for managing quality of service (QoS) information in a fibre channel fabric, the system comprising:
    memory;
    a processor coupled to the interface and memory, the processor configured to identify a first plurality of devices in a first zone in the fibre channel fabric and assign a first quality of service level to the first zone, wherein assigning the first quality of service level to the first zone comprises assigning the first quality of service level to communications between the first plurality of devices; and
    an interface coupled to the processor, the interface configured to distribute zone information along with quality of service information in the fibre channel fabric;
    wherein the processor is further configured to identify a second plurality of devices in a second zone in the fibre channel fabric and assign a second quality of service level to the second zone, wherein assigning the second quality of service level to the second zone comprises assigning the second quality of service level to communications between the second plurality of devices.

13. The method of claim 12, wherein the first quality of service level is a quality of service marker.

14. The method of claim 12, wherein the first quality of service level is a quality of service indicator designating a priority level for traffic associated with the first plurality of devices.

15. The method of claim 12, wherein the first plurality of devices are devices involved in online transactions.

16. The method of claim 12, wherein the first plurality of devices are devices involved in backing up user data.

17. The method of claim 12, wherein the first quality of service level and the second quality of service level are assigned at a fibre channel switch.

18. The method of claim 12, wherein the first plurality of devices includes hosts and end devices.

19. The method of claim 18, wherein the first plurality of devices includes tape devices and disk arrays.

20. The method of claim 12, wherein the first zone is maintained as a first zone object in a zone database.

21. The method of claim 20, wherein the first zone object includes the first quality of service level as a parameter.

22. The method of claim 21, wherein the first zone object further includes identifiers corresponding to the first plurality of devices.

23. A device for managing quality of service (QoS) information in a fibre channel fabric, the device comprising:
    means for identifying a first plurality of devices in a first zone in the fibre channel fabric;
    means for assigning a first quality of service level to the first zone, wherein assigning the first quality of service level to the first zone comprises assigning the first quality of service level to communications between the first plurality of devices;
    means for identifying a second plurality of devices in a second zone in the fibre channel fabric; and
    means for assigning a second quality of service level to the second zone, wherein assigning the second quality of service level to the second zone comprises assigning the second quality of service level to communications between the second plurality of devices.

24. A computer readable medium encoded with computer executable instructions, the computer readable medium comprising:
    computer executable instructions for identifying a first plurality of devices in a first zone in the fibre channel fabric;
    computer executable instructions for assigning a first quality of service level to the first zone, wherein assigning the first quality of service level to the first zone comprises assigning the first quality of service level to communications between the first plurality of devices;
    computer executable instructions for identifying a second plurality of devices in a second zone in the fibre channel fabric; and
    computer executable instructions for assigning a second quality of service level to the second zone, wherein assigning the second quality of service level to the second zone comprises assigning the second quality of service level to communications between the second plurality of devices.

* * * * *

UNITED STATES PATENT AND TRADEMARK OFFICE
CERTIFICATE OF CORRECTION

PATENT NO. : 7,653,054 B2  Page 1 of 1
APPLICATION NO. : 11/153656
DATED : January 26, 2010
INVENTOR(S) : Banerjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Twenty-eighth Day of December, 2010

David J. Kappos
*Director of the United States Patent and Trademark Office*